United States Patent
Mihan et al.

(10) Patent No.: US 6,335,402 B1
(45) Date of Patent: Jan. 1, 2002

(54) SOLID REACTOR WITH AN ANTISTATIC COATING FOR CARRYING OUT REACTIONS IN A GASEOUS PHASE

(75) Inventors: Shahram Mihan, Ludwigshafen; Armin Lange, Heidelberg; Wolfgang Rohde, Speyer, all of (DE)

(73) Assignee: Basell Polyolefine (DE)

( * ) Notice: Subject to any disclaimer, the term of this patent is extended or adjusted under 35 U.S.C. 154(b) by 0 days.

(21) Appl. No.: 09/744,451

(22) PCT Filed: Aug. 4, 1999

(86) PCT No.: PCT/EP99/05633

§ 371 Date: Jan. 25, 2001

§ 102(e) Date: Jan. 25, 2001

(87) PCT Pub. No.: WO00/07716

PCT Pub. Date: Feb. 17, 2000

(30) Foreign Application Priority Data

Aug. 6, 1998 (DE) .......................................... 198 35 467

(51) Int. Cl.$^7$ .................................................. C08F 2/34
(52) U.S. Cl. ........................... 526/62; 526/74; 422/137; 422/241; 422/240
(58) Field of Search ........................... 526/62, 901, 74; 422/137, 241, 240

(56) References Cited

U.S. PATENT DOCUMENTS

| 3,917,466 A | 11/1975 | Henry |
| 4,105,841 A | 8/1978 | Settineri |
| 4,166,536 A | 9/1979 | Roberts |
| 4,267,291 A | 5/1981 | Jones |
| 4,855,370 A | 8/1989 | Chirillo |
| 5,026,795 A | 6/1991 | Hogan |
| 5,034,481 A | 7/1991 | Funk |
| 5,414,064 A | * 5/1995 | Lux et al. ................. 526/215 |

FOREIGN PATENT DOCUMENTS

| DE | 35 43 360 | 6/1987 |
| EP | 584 574 | 3/1994 |
| EP | 653 441 | 5/1995 |
| EP | 712 866 | 5/1996 |
| EP | 811 638 | 12/1997 |
| EP | 0811638 A2 | * 12/1997 |
| WO | 86/07065 | 12/1986 |
| WO | 93/24562 | 12/1993 |
| WO | WO-9749771 | * 12/1997 |
| WO | 97/49771 | 12/1997 |

OTHER PUBLICATIONS

BASF 46778 = EP 803 514.
Ullmann's Enc., vol. A21, 1992, 511ff.
Ullmann's Enc. vol. A21, 1992, 501ff.

* cited by examiner

Primary Examiner—David W. Wu
Assistant Examiner—William K. Cheung

(57) ABSTRACT

The inner wall of a solids reactor for carrying out reactions in the gas phase is coated with an antistatic layer having a thickness of 0.1–800 µm and consisting essentially of a poly-α-olefin and a nonvolatile antistatic agent.

7 Claims, No Drawings

SOLID REACTOR WITH AN ANTISTATIC COATING FOR CARRYING OUT REACTIONS IN A GASEOUS PHASE

The present invention relates to solids reactors for carrying out reactions in the gas phase and to plant components for handling fluidized solids, whose inner wall is coated with a thin antistatic layer consisting essentially of a poly-α-olefin and a nonvolatile antistatic agent. It further relates to a process for coating such reactors and plant components, the use of such reactors for the polymerization and copolymerization of a α-olefins and to a process for the polymerization of α-olefins using a coated reactor.

In the polymerization of a α-olefins in the gas phase, deposits are frequently formed on the walls of the reactor. It is known that this deposit formation is at least partly attributable to electrostatic charging, as disclosed, for example, by WO 86/07065. Owing to electrostatic forces, catalyst and polymer particles adhere to the wall of the reactor and finally bake together under the action of the heat of polymerization liberated to form solid deposits. These deposits can fall off and lead to blocking of the product discharge system. They thus cause problems in the continuous operation of such polymerization plants, increase the need for cleaning and can make more frequent stopping of the plant necessary. In addition, in the gas-phase fluidized-bed process, the fluidization behavior of the bed is adversely affected.

Problems with electrostatic charging are also known in the handling of poly-α-olefins. Thus, for example, electrostatic charging can easily occur when conveying poly-α-olefins in pneumatic conveying systems or when filling and emptying silos and this can lead to wall deposits and blockages. Electrostatic charging can also be the cause of dust explosions.

Electrostatic charging is influenced in a complex way by numerous system parameters of the gas-phase polymerization process, for example by the particle size distribution of the polymer and of the catalyst, the chemical composition of the catalyst, the internal reactor temperature, the reaction pressure and the composition of the circulating gas.

To solve this problem, it has been proposed that the polymerization be carried out in the presence of various antistatic agents. Thus, for example, U.S. Pat. No. 4,855,370 discloses the use of water as antistatic agent, U.S. Pat. No. 5,026,795 discloses mixtures of polysulfone copolymers/polyamines and a sulfonic acid, EP-A 364 759 discloses Kerostat® (mixture of chromium stearylanthranilate, calcium medialanate and di-t-butylphenol), EP-A 584 574 discloses mixtures of alcohol phosphate salts and quaternary ammonium salts, EP-A 653 441 discloses the use of naphthoquinone dimer compounds and EP-A 636 636 discloses metal salts of anthranilic acid. The use of Stadis® 450 (EP-A 803 514, polyamine/polysulfone) or of particularly suitable amines (EP-A 811 638) has been proposed specifically for α-olefin polymerization using metallocene catalysts. Furthermore, U.S. Pat. No. 4,803,251 has proposed measuring the electrostatic potential in the reactor during the polymerization and, depending on the presence of excess positive or negative charge, using exactly the correct amount of either methanol or methyl isobutyl ketone to neutralize the respective charge. However, this process is complicated in terms of measurement and regulation.

Although the problems in respect of deposits on the reactor wall can be largely solved by means of the processes described, they all have the disadvantage that the antistatic agent or its solvent, e.g. propanol, introduced into the reaction space can reduce the activity of the catalysts used. Only low catalyst productivities are therefore achieved. Metallocene catalysts in particular are extremely sensitive to polar components in the antistatic agent. Furthermore, polar components can modify the catalysts and thus change the product properties.

It has therefore also been proposed (WO 86/7065) that the reactor wall be treated with a chromocene compound in order to reduce the electrostatic charging of the reactor. However, this treatment takes from a number of hours to a number of days. In addition, chromocene is complicated and expensive to prepare and is very sensitive to impurities and therefore difficult to handle. Furthermore, the antistatic action does not last long.

It has also been proposed (RD 23803 (1984)) that the inner wall of the reactor be sprayed with a composition comprising an aromatic polyimide, Teflon and pigments such as chromium oxides or iron oxides and the mixture be crosslinked. The coating formed in this way has a thickness of 1–3 mm. However, a thick, Teflon-containing layer of this type is very expensive. In addition, the spraying and crosslinking of such a layer can only be carried out with the reactor open, so that the coating procedure or any necessary repairs to the coating can only be carried out after the production plant has been shut down.

Coating with comparatively soft polymers is generally problematical since it has to be feared that they might be abraded by hard constituents of the fluidized bed, e.g. catalyst particles.

It is an object of the present invention to find an antistatic coating for solids reactors for carrying out reactions in the gas phase which is cheap, simple and quick to apply and repair, which has good durability and, in particular, is not abraded under the conditions for the polymerization of α-olefins in the gas phase.

We have found that this object is achieved by a coating comprising polyolefins and nonvolatile antistatic agents.

The present invention accordingly provides reactors for carrying out reactions in the gas phase and plant components for handling fluidized solids whose inner wall is coated with a thin antistatic coating having a thickness of 0.1–800 $\mu$m and consisting essentially of a poly-α-olefin and a nonvolatile antistatic agent. We have also found a process for coating such reactors and plant components, the use of such reactors for the polymerization and copolymerizaton of α-olefins and a process for the polymerization of α-olefins using coated reactors.

The reactors of the present invention can be all types of reactors which can be used for carrying out reactions in the gas phase. For the purposes of the present invention, the term reaction is not restricted to chemical reactions but also includes other chemical engineering operations which can be carried out in the gas phase, for example drying or classification in the gas phase. The reactors of the present invention are preferably used for reactions of organic solids, in particular for the polymerization of α-olefins in the gas phase. Possible reactor types are, in particular, stirred autoclaves, fluidized-bed reactors, stirred fluidized-bed reactors, fluidized-bed reactors with a circulating fluidized bed or flow tubes.

Furthermore, reactors for other gas-phase operations used in chemical engineering can be treated according to the present invention, for example reactors which can be used for drying fluidized solids, in particular organic solids, e.g. fluidized-bed driers or spray driers.

The plant components treated according to the present invention can be any components of chemical plants in which solids, in particular organic solids and very particularly preferably poly-α-olefins, are fluidized, for example pipes and other components of pneumatic conveying systems or silos.

The inner wall is coated with a layer having an antistatic action. Preference is given to coating the entire reaction space, but it is also possible to coat only those parts of the wall of the reactor on which deposits are preferentially formed during the course of the reaction. The thickness of the antistatic layer on the reactor wall is from 0.1 to 800 μm, in particular from 1 to 100 μm, particularly preferably from 5 to 10 μm.

The antistatic layer consists essentially, i.e. to an extent of at least 90% by weight based on the sum of all constituents, of a poly-α-olefin and a nonvolatile antistatic agent.

Preferred poly-α-olefins are polymers of α-olefins having from 2 to 8 carbon atoms; particular preference is given to polyethylene and polypropylene. The invention also encompasses copolymers of various α-olefins. Preferred comonomers for polyethylene are propene, 1-butene, 1-pentene, 4-methyl-1-pentene, 1-hexene, 1-heptene and 1-octene and also mixtures of these α-olefins. The poly-α-olefins can further comprise other comonomers, for example those containing polar groups, e.g. (meth)acrylic acid, (meth)acrylates or (meth)acrylamide. However, the proportion of such monomers preferably does not exceed 5 mol%, based on the sum of all monomers. It is also possible to use mixtures of 2 or more polymers.

The content of nonvolatile antistatic agent in the antistatic coating is from 0.1 to 50% by weight, based on the sum of all constituents. The content of antistatic agent is preferably from 1 to 25% by weight and particularly preferably from 5 to 15% by weight.

For the purposes of the present invention, the term nonvolatile covers all antistatic agents whose vapor pressure is sufficiently low for them, embedded in a matrix of poly-α-olefins, not to go into the gas phase, or at most to go into it in very small amounts, at temperatures of up to 150° C. The term antistatic agent encompasses not only individual compounds but also mixtures of various compounds having an antistatic action.

Suitable nonvolatile antistatic agents are, for example, finely divided, porous carbon blacks, polyhydric alcohols and their ethers, for example sorbitol, polyalcohols, polyalcohol ethers, polyvinyl alcohols, polyethylene glycols and their ethers with fatty alcohols, and anionic antistatic agents such as $C_{12}$–$C_{22}$-fatty acid soaps of alkali metals or alkaline earth metals, salts of alkyl sulfates of higher primary or secondary alcohols having the formula $ROSO_3M$ (M=alkali metal, alkaline earth metal) or $(RR')CHOSO_3M$, salts of mixed esters of polyfunctional alcohols with higher fatty acids and sulfuric acid, $C_{12}$–$C_{22}$-sulfonic acids or their salts of the formula $RSO_3M$, alkylarylsulfonic acids or their salts, e.g. dodecylbenzenesulfonic acid, phosphoric acid derivatives such as di(alkoxypolyethoxyethyl) phosphates of the formula $[RO(CH_2CH_2O)_n]_2POOM$ or phytic acid derivatives as disclosed, for example, in EP-A 453116, cationic antistatic agents such as quaternary ammonium salts of the formula $R_1R_2R_3R_4NX$, where X is a halogen atom and $R_1$ to $R_4$ are alkyl radicals, preferably those having at least 8 carbon atoms. Also suitable are, for example, metal complexes such as the cyanophthalocyanines disclosed in WO 93/24562.

Particularly useful nonvolatile antistatic agents are nonvolatile nitrogen-containing compounds such as amines or amides or their salts, in particular oligomeric or polymeric amines and amides. Examples which may be mentioned are polyethoxyalkylamines or polyethoxyalkylamides of the formula $R_1N[(R_2O)_mR]$ $[(R_3O)_nH]$ or $R_1CON[(R_2O)_mR]$ $[(R_3O)_nH]$ as described in DE-A 31 088 43, which are also constituents of commercial antistatic agents (e.g. Atmer® 163 from ICI). It is also possible to use salt mixtures of calcium salts of medialanic acid and chromium salts of N-stearylanthranilic acid, as described in DE-A 3543360, or mixtures of a metal salt of medialanic acid, a metal salt of anthranilic acid and a polyamine, as described in EP-A 636 636.

Further particularly useful compounds are polyamines or polyamine copolymers or mixtures of such compounds with further compounds, in particular polymeric compounds. Apart from simple polyamines such as polyvinylamine, suitable nonvolatile polyamines are advantageously obtained from the reaction of aliphatic primary monoamines such as n-octylamine or n-dodecylamine or N-alkyl-substituted aliphatic diamines such as N-n-hexadecylpropane-1,3-diamine and epichlorohydrin. These polymers have hydroxyl groups in addition to amino groups. An overview of such polyamine copolymers is given in U.S. Pat. No. 3,917,466. Polymers which are particularly suitable for use together with polyamines or polyamine copolymers are polysulfone copolymers. The polysulfone copolymers are preferably largely unbranched and are made up of olefins and $SO_2$ units in a molar ratio of 1:1. An example is 1-decene polysulfone. An overview of suitable polysulfone copolymers is also given in U.S. Pat. No. 3,917,466.

Mixtures of polyamines and polysulfone copolymers are also constituents of commercially available antistatic agents such as Stadis® 450 (DuPont) or Polyflo® 130 (Universal Oil Company).

The nonvolatile antistatic agent is preferably distributed homogeneously in the polymer matrix.

The choice of suitable polymers and suitable nonvolatile antistatic agents depends on the respective application and can be made largely freely. It is restricted only insofar as the softening point of the antistatic coating has to lie above the temperature at which the desired reaction or process step is to be carried out. The polymer chosen for the antistatic coating is preferably one of the same type as that which is to be produced or handled, i.e., for example, a polyethylene-containing coating for the production of polyethylene.

The coating applied according to the present invention may further comprise additional additives and auxiliaries in small amounts, e.g. ones for improving the adhesion of the layer to the reactor wall. The amount of such constituents should, however, never exceed 10% by weight, based on the sum of all constituents.

The coating provided according to the present invention can be applied in a simple way by treating the wall of the reactor or the plant component with a poly-α-olefin at the softening point and a nonvolatile antistatic agent.

The process can be carried out, for example, by introducing a sufficient amount of the desired poly-α-olefin and the desired antistatic agent into the reactor. The mixture is distributed uniformly in the reactor, e.g. by stirring by means of a built-in stirrer or by fluidization using an inert gas stream, preferably a stream of nitrogen, and the reactor is heated to the softening point of the polymer. It is usual to select a temperature which is from about 5 to 15° C., preferably from 8 to 10° C., below the melting point of the polymer. The antistatic agent is added either in finely divided form as a solid or advantageously dissolved in suitable solvents. The addition of the antistatic agent can be carried out before, during or immediately after heating. The solvent and any further volatile constituents present in the antistatic agent evaporate so that only the nonvolatile components of the antistatic agent remain. The duration of the treatment depends on the conditions selected, but is normally less than 4 hours. The treatment of the reactor can be carried out at atmospheric pressure or at a superatmospheric pressure of preferably not more than 80 bar. The thickness of the antistatic layer formed can be set as a function of the softening temperature of the poly-α-olefin used, the temperature and the coating time.

Even though the method indicated is preferred, the present invention is not restricted thereto, but also encompasses application of the coating to the inner wall of the reactor in any other way, e.g. by dissolving the polymer and the nonvolatile antistatic agent in a suitable solvent, spraying-on the solution and evaporating the solvent.

The reactor of the present invention is very well suited to the polymerization and copolymerization of α-olefins in the gas phase. Ethylene and propylene and in particular ethylene can be homopolymerized or copolymerized particularly readily. Possible comonomers are, in particular, α-olefins having from 3 to 8 carbon atoms, specially propene, 1-butene, 1-pentene, 4-methyl-1-pentene, 1-hexene, 1-heptene and 1-octene and also mixtures of these α-olefins.

The polymerization is carried out at from 30 to 150° C., preferably from 80 to 120° C. The pressure is from 5 to 80 bar, preferably from 20 to 60 bar.

The polymerization can be carried out by various gas-phase processes using the abovementioned antistatically coated reactors, i.e. for example in gas-phase fluidized beds or in stirred gas phases. Such gas-phase processes are known per se and are described, for example, in Ullmann's Encyclopedia of Industrial Chemistry, Vol. A 21, 4th edition 1992, p. 511 ff.

The process of the present invention can be carried out using various catalysts as are customary for the polymerization of α-olefins. Examples of suitable catalysts are the supported chromium catalysts also known as Phillips catalysts. Further catalysts which can be used in the process of the present invention are supported Ziegler catalysts or Ziegler-Natta catalysts. Customary supported catalysts of the abovementioned types are described, for example, in Ullmann's Encyclopedia of Industrial Chemistry, Vol. A 21, 4th edition 1992, p. 501 ff. It is also possible to use a supported metallocene catalyst, e.g. as disclosed in EP-A 803 514, as catalyst or constituent of the catalyst mixture. Other organometallic, polymerization-active complexes can also be used.

The coating applied according to the present invention is effective in reducing the electrostatic charging of the reactors of the present invention during the course of the polymerization. Instead of a charge of up to several thousand volts without a coating, the charge on a reactor coated according to the present invention fluctuates only around zero. Wall deposits can thereby be avoided virtually completely and the yields of the reaction rise significantly. This effect surprisingly occurs even at a coating thickness of a few μm.

The coating applied according to the present invention has the further advantage that it can be applied in a short time. The existing, customary inlet and outlet points present on the plant can be used for carrying out the coating process, so that it is not necessary to open or enter the reactor in order to carry out the coating process. The coating agents are advantageously distributed in the reactor by means of the stirrers installed in the reactor or the fluidization facilities and heating is advantageously carried out using the existing heating facilities. As a result of the low coating thickness, only a small amount of material is consumed in the coating process. Coating of the reactor is thus cheap.

Particularly surprisingly, the antistatic coatings applied according to the present invention have a very high mechanical stability and durability under operating conditions. To remove the antistatic layer, the inner wall of the reactor has to be polished thoroughly using an abrasive material. The antistatic action lasts for a number of months.

The reactors of the present invention therefore make a very useful contribution to more economical production of poly-α-olefins.

The following examples illustrate the invention without restricting its scope.

The measured properties described were determined in the following way:

| | |
|---|---|
| Density | In accordance with ISO 1183 |
| Staudinger index | In accordance with ISO 1628 |
| Electric potential | measured using a commercial electric field measuring instrument; the measuring electrode was located in the middle of the reactor 2 cm above the bottom, the tip of the probe was insulated from the reactor wall; the reactor was grounded. |
| Thickness of the antistatic layer | measured by means of ultrasound in running-time measurements |

EXAMPLE 1

Coating of the reactor

A 1 l autoclave was charged under a nitrogen atmosphere with 300 g of polyethylene of the grade Lupolen® 6021 D (melting point: 131° C.) and, while stirring at 120° C. under 30 bar of nitrogen, 40 ml of a 25% strength solution of the antistatic agent Stadis® 450 (from DuPont, mixture of dodecylbenzenesulfonic acid, a copolymer of epichlorohydrin and N-alkyl-1,3-diaminopropane and an alternating polysulfone copolymer of 1-decene and $SO_2$, solvent: toluene, isopropanol and 1-decene) in hexane were added. After 3 hours, the autoclave was emptied. A 5 μm thick layer of polyethylene and the antistatic agent had formed on the reactor wall.

EXAMPLE 2

The procedure of Example 1 was repeated using polyethylene of the grade Lupolen® 4261 A (melting point: 125° C.) and a coating temperature of 115° C. The thickness of the antistatic layer formed was 7 μm.

EXAMPLE 3

The procedure of Example 1 was repeated using polyethylene of the grade Lupolen® 3621 D (melting point: 120° C.) and a coating temperature of 110° C. The thickness of the antistatic layer formed was 10 μm.

EXAMPLE 4

Preparation of a Phillips catalyst having a Cr content of 1%

185 g of silca gel (SG 332, Grace) was suspended in 400 ml of a solution of $Cr(NO_3)_3$*9 $H_2O$ (3.56% by weight) in methanol. After 30 minutes, methanol was taken off and the catalyst precursor obtained was activated with air at 650° C.

EXAMPLES 5 AND 6

Polymerization experiments at 110° C. and an ethylene pressure of 40 bar using the chromium(VI) catalyst described in Example 4 were carried out in the autoclave which had been coated as described in Example 1. Data regarding the polymerization conditions, the product properties and the electrostatic behavior during the polymerization are summarized in Table 1.

EXAMPLES 7 AND 8

Polymerization experiments at 110° C. and an ethylene pressure of 40 bar using the chromium catalyst described in Example 4 were carried out in the autoclave which had been coated as described in Example 2. Data regarding the polymerization conditions, the product properties and the electrostatic behavior during the polymerization are summarized in Table 1.

EXAMPLES 9 AND 10

Polymerization experiments at 110° C. and an ethylene pressure of 40 bar using the chromium catalyst described in Example 4 were carried out in the autoclave which had been coated as described in Example 3. Data regarding the polymerization conditions, the product properties and the electrostatic behavior during the polymerization are summarized in Table 1.

COMPARATIVE EXAMPLES 11 AND 12

Polymerization experiments at 100° C. and an ethylene pressure of 40 bar were carried out as in Examples 5 and 6, except that an uncoated reactor was used in place of a coated reactor. Data regarding the polymerization conditions, the product properties and the electrostatic behavior during the polymerization are summarized in Table 1.

COMPARATIVE EXAMPLE 13

200 g of a polyethylene powder which had a density of 0.9465 g/cm$^3$ and a high load melt flow rate of 6.5 g/10 min and had been dried at 80° C. for 10 hours were introduced under nitrogen into an uncoated 1 l autoclave. The autoclave was pressurized with 30 bar of nitrogen. Whilst stirring, the autoclave was heated to 100° C. over a period of 30 minutes. At 400 rpm, a charge of −4500 V/m was measured. After stirring for 1 hour, the reactor was cooled to room temperature and opened. The reactor wall was covered with a 1 cm thick layer of polyethylene powder.

EXAMPLE 14

Comparative Example 13 was repeated except that a reactor which had been coated as described in Example 3 was used. The electric field measurement indicated no charging (±200 V/m). The reactor wall was free of polyethylene particles.

The examples show that electrostatic charging in the polymerization experiments in the coated reactor is considerably less than in the uncoated reactor. In the experiments in the uncoated reactor, large amounts of wall deposits were formed, so that the yield of the experiments was significantly reduced.

TABLE 1

Polymerization experiments in an antistatically coated gas-phase autoclave

| No. | Coating | Polymerization time [min] | Polyethylene yield [g] | Productivity [g PE/g cat.] | Density of the PE obtained [g/cm$^3$] | Staudinger index η [dm$^3$/g] | Electric field intensity [V/m] |
|---|---|---|---|---|---|---|---|
| Example 5 | Stadis ® 450/ Lupolen ® 6021 D | 90 | 245 | 2900 | 0.9512 | 5.83 | +/− 190* |
| Example 6 | Stadis ® 450/ Lupolen ® 6021 D | 90 | 255 | 3000 | 0.9503 | 5.28 | +/− 180* |
| Example 7 | Stadis ® 450/ Lupolen ® 4261 A | 90 | 270 | 2500 | 0.9490 | 6.14 | +/− 180* |
| Example 8 | Stadis ® 450/ Lupolen ® 4261 A | 90 | 230 | 2800 | 0.9515 | 5.19 | +/− 175* |
| Example 9 | Stadis ® 450/ Lupolen ® 3621 D | 70 | 225 | 2600 | 0.9495 | 5.53 | +/− 175* |
| Example 10 | Stadis ® 450/ Lupolen ® 3621 D | 70 | 210 | 2600 | 0.9507 | 6.37 | +/− 185* |
| Comparative Example 11 | none | 90 | 135 | 2300 | 0.9489 | 5.30 | −2500 |
| Comparative Example 12 | none | 90 | 205 | 2700 | 0.9492 | 5.55 | −2300 |

*Measurement fluctuates around zero from −175 (−180 V) to +175 (+180 V)

We claim:
1. A solids reactor for carrying out reactions in the gas phase whose inner wall of the reaction space is coated with an antistatic layer having a thickness of 0.1–800 μm and consisting essentially of a poly-α-olefin and a nonvolatile antistatic agent.
2. A plant component in which solids are fluidized, whose inner wall is coated with an antistatic layer having a thickness of 0.1–800 μm and consisting essentially of a poly-α-olefin and a nonvolatile antistatic agent.
3. The solids reactor or plant component of claim 1, wherein the antistatic layer contains 0.01–50% by weight of a nonvolatile antistatic agent.
4. The solids reactor or plant component of claim 1, wherein the nonvolatile antistatic agent is a nitrogen-containing, oligomeric or polymeric compound.
5. The solids reactor of claim 1, which is a stirred autoclave, a fluidized-bed reactor, a stirred fluidized-bed reactor, a fluidized bed reactor with a circulating fluidized bed or a tube reactor.
6. A process for coating a solids reactor for carrying out reactions in the gas phase and for coating plant components in which solids are fluidized, which comprises treating their inner wall with a poly-α-olefin at the softening point and a nonvolatile antistatic agent.

7. A process for the polymerization or copolymerization of α-olefins in the gas phase at from 30 to 150° C. and a pressure of from 5 to 80 bar using a supported catalyst, wherein the polymerization is carried out in the coated solids reactor of claim 1.

* * * * *